United States Patent

Knoll

(10) Patent No.: US 8,890,749 B2
(45) Date of Patent: Nov. 18, 2014

(54) TRANSCEIVER DEVICE

(75) Inventor: Bernhard Theo Knoll, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 1886 days.

(21) Appl. No.: 11/629,942

(22) PCT Filed: May 18, 2005

(86) PCT No.: PCT/DE2005/000906
§ 371 (c)(1),
(2), (4) Date: Oct. 13, 2008

(87) PCT Pub. No.: WO2005/124671
PCT Pub. Date: Dec. 29, 2005

(65) Prior Publication Data
US 2009/0051538 A1    Feb. 26, 2009

(30) Foreign Application Priority Data

Jun. 18, 2004  (DE) .......................... 10 2004 029 440

(51) Int. Cl.
*H01Q 1/38* (2006.01)
(52) U.S. Cl.
USPC .................................................. 343/700 MS
(58) Field of Classification Search
CPC ..... H01Q 1/38; H01Q 9/0407; H01Q 9/0421; H01Q 1/243; H01Q 5/0003
USPC .................... 343/700 MS, 853, 909
See application file for complete search history.

(56) References Cited

U.S. PATENT DOCUMENTS

| | | | |
|---|---|---|---|
| 5,115,245 A * | 5/1992 | Wen et al. ...................... | 342/175 |
| 6,452,554 B1 * | 9/2002 | Aoyama et al. ................ | 343/702 |
| 6,597,318 B1 * | 7/2003 | Parsche et al. ......... | 343/700 MS |
| 6,677,901 B1 * | 1/2004 | Nalbandian ............ | 343/700 MS |
| 6,731,246 B2 * | 5/2004 | Parsche et al. ................ | 343/741 |
| 6,759,988 B2 * | 7/2004 | Purr et al. ............. | 343/700 MS |
| 6,879,298 B1 * | 4/2005 | Zarro et al. .................... | 343/786 |
| 6,967,621 B1 * | 11/2005 | Cadotte et al. ......... | 343/700 MS |
| 6,985,118 B2 * | 1/2006 | Zarro et al. .................... | 343/756 |
| 7,050,004 B2 * | 5/2006 | Shafai et al. ........... | 343/700 MS |
| 7,098,852 B2 * | 8/2006 | Ikuta et al. ............. | 343/700 MS |

(Continued)

FOREIGN PATENT DOCUMENTS

DE      36 13 258 A1    10/1987
DE     101 18 742 A1    11/2001

(Continued)

OTHER PUBLICATIONS

Algilent Technologies, Momentum, Sep. 2004.*

(Continued)

*Primary Examiner* — Huedung Mancuso
(74) *Attorney, Agent, or Firm* — Dicke, Billig & Czaja, PLLC

(57) ABSTRACT

One aspect of the invention relates to a transceiver device with a substrate with a layer of dielectric material with a relative permeability of greater than 1 and/or with a magnetic material with a relative magnetic permeability of greater than 1. An antenna is monolithically integrated in the substrate and/or in the layer, and the antenna is arranged for transmitting and for receiving signals. A circuit is monolithically integrated in the substrate which is coupled to the monolithically integrated antenna.

20 Claims, 1 Drawing Sheet

(56) References Cited

U.S. PATENT DOCUMENTS

| | | | |
|---|---|---|---|
| 7,151,506 B2* | 12/2006 | Knowles et al. | 343/909 |
| 7,170,462 B2* | 1/2007 | Ihara et al. | 343/788 |
| 7,405,698 B2* | 7/2008 | de Rochemont | 343/700 MS |
| 7,463,199 B2* | 12/2008 | Soler Castany et al. | 343/700 MS |
| 7,608,469 B2* | 10/2009 | Koh | 438/18 |
| 7,615,836 B2* | 11/2009 | Lian et al. | 257/421 |
| 7,884,724 B2* | 2/2011 | Tuttle et al. | 340/572.7 |
| 2001/0002826 A1* | 6/2001 | Tuttle et al. | 343/872 |
| 2002/0003496 A1* | 1/2002 | Brady et al. | 343/700 MS |
| 2002/0008428 A1* | 1/2002 | Smola et al. | 307/413 |
| 2003/0029920 A1* | 2/2003 | Chhor et al. | 235/492 |
| 2003/0132430 A1* | 7/2003 | Tsai | 257/2 |
| 2003/0137446 A1* | 7/2003 | Vavik | 342/51 |
| 2004/0084758 A1* | 5/2004 | Chuang et al. | 257/673 |
| 2004/0239453 A1* | 12/2004 | Sasada | 333/219.1 |
| 2005/0146472 A1* | 7/2005 | Ihara et al. | 343/718 |
| 2005/0174294 A1* | 8/2005 | Peroulis et al. | 343/746 |
| 2005/0250388 A1* | 11/2005 | Follingstad et al. | 439/668 |
| 2006/0109124 A1* | 5/2006 | Dixon et al. | 340/572.1 |
| 2006/0250298 A1* | 11/2006 | Nakazawa et al. | 342/70 |
| 2008/0068177 A1* | 3/2008 | Copeland | 340/572.7 |
| 2008/0171176 A1* | 7/2008 | Hirmer et al. | 428/156 |

FOREIGN PATENT DOCUMENTS

| | | |
|---|---|---|
| EP | 0 055 324 B1 | 8/1990 |
| EP | 0 296 838 B1 | 3/1996 |
| EP | 0 743 615 B1 | 8/2000 |

OTHER PUBLICATIONS

C.W. Pobanz et al., "Active Integrated Antennas for Microwave Wireless Systems", Signals, Systems, and Electronics, 1995. ISSSE '95, Proceedings, 1995 URSI International Symposium on San Francisco, USA Oct. 25-27, 1995, New York, NY, USA, IEEE, US, Oct. 25, 1995, pp. 1-4, XP010159164, ISBN: 0-7803-2516-8.

R. Araneo et al., "FE Analysis of a Low-Frequency Microstrip Antenna", IEEE Transactions on Magnetics, vol. 38, No. 2, Mar. 2002, pp. 729-732, XP002341656.

Hitachi Develops a New RFID with Embedded Antenna μ-Chip—Makes Possible Wireless Links that Work Using Nothing More Than a 0.4mm X 0.4mm Chip, One of the World's Smallest Ics—, Hitachi News Releases, 'Online! Sep. 2, 2003, XP002341658.

Finkenzeller, K., "4.2 Elektromagnetische Wellen; 4 Physikalische Grundlagen für RFID-Systeme," RFID Handbuch, Hanser Verlag, pp. 123-135 (Sep. 26, 2002).

Usami, M., "An Ultra Small RFID Chip: μ-chip," IEEE Radio Frequency Integrated Circuits Symposium, pp. 241-244 (2004).

* cited by examiner

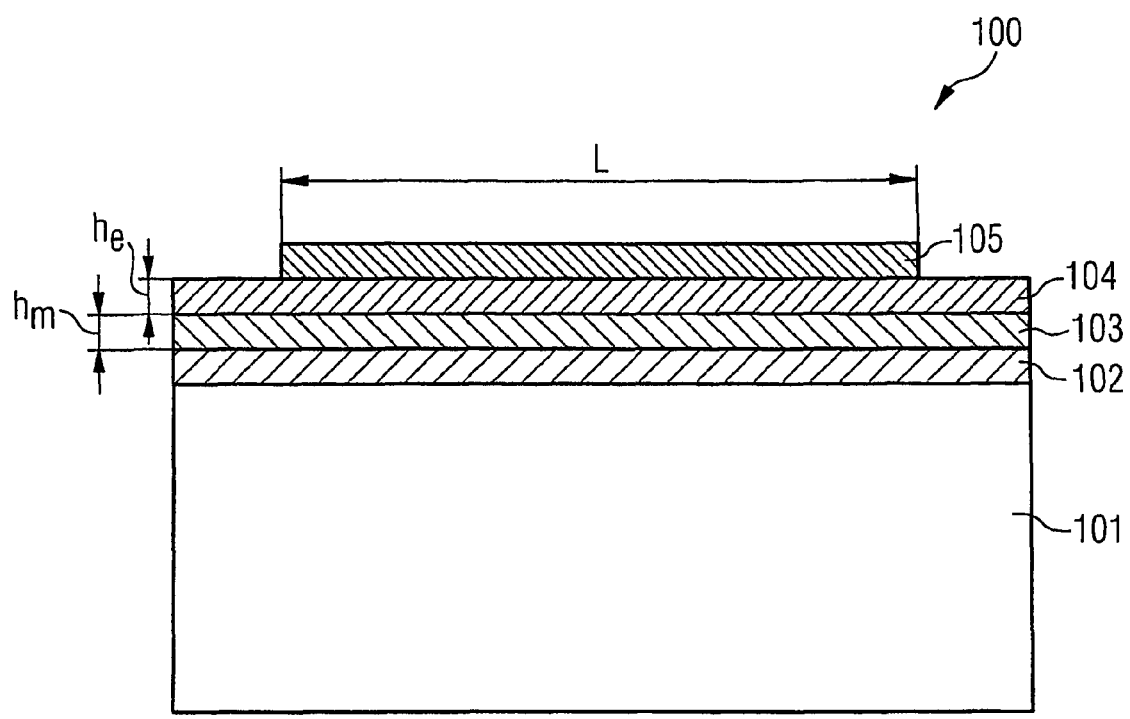

TRANSCEIVER DEVICE

CROSS REFERENCE TO RELATED APPLICATION

This Utility Patent Application claims the benefit of the filing date of German Application No. 10 2004 029 440.2, filed Jun. 18, 2004, and International Application No. PCT/DE2005/000906, filed May 18, 2005, both of which are herein incorporated by reference.

BACKGROUND

One aspect of invention relates to a transceiver device.

In wireless communication, prior art antennas are implemented as independent passive components, i.e. as components provided separately from a chip, which are not integrated in such an electronic chip.

One application for antennas in wireless communication are the so called radio frequency identification tags (RFID tags). Radio frequency identification (RFID), the identification by radio transmission, is a method for being able to read and store data contactlessly. Such data are stored on RFID tags (electronic tags), often also transponders. The stored data are read by means of electromagnetic waves which can be coupled in via the antenna in the RFID tag and can be radiated by the antenna, respectively. The constructional size of an RFID tag is significantly determined by the antenna contained in it and thus forms a limiting factor with regard to the miniaturization of RFID tags. RFID tags known from the prior art typically have dimensions of a few millimeters to some centimeters.

RFID tags are used in electronic stock protection systems for preventing thefts, applications in automation technology (e.g. automatic identification of vehicles in traffic as part of toll systems), access control systems, cashless payment, ski passes, fuel cards, identification of animals and applications in lending libraries.

An RFID tag usually contains an antenna, a circuit for receiving and transmitting electromagnetic waves (transponder) and a signal processing circuit. Active RFID tags are battery-operated, passive RFID tags receive their energy for transmitting the information from the radio waves received.

The fact that antennas on RFID tags are usually implemented as passive components, i.e. as non-integrated circuit components, is mainly based on the fact that the energy transfer required for the communication makes (minimum) demands on the length of the antenna. Thus, for example, the radiated power of a dipole antenna decreases distinctly when the antenna becomes shorter than $\lambda/4$, $\lambda$ being the wavelength of the electromagnetic radiation. As well, the smaller the dimension of the antenna, the lower the power transferred in the near field by dipole/dipole coupling in an RFID application.

Producing a non-integrated antenna separately is very expensive and in addition, further costs arise for connecting antenna to chip in a packaging process. In an RFID application, the costs for chip production, antenna production and packaging are distributed in approximately equal parts. Integrating the antenna could thus reduce the costs by at least one half.

From http://www.hitachi.com/New/cnews/030902.html, an RFID chip with an integrated antenna is known which has a dimension of 0.4 mm×0.4 mm. However, this RFID chip with integrated and thus miniaturized antenna has the disadvantage that it exhibits extremely poor coupling of the antenna to the electrical field of a readar. This leads to an extremely short range of the RFID chip with integrated antenna known from http://www.hitachi.com/New/cnews/030902.html. Although the μ chip known from http://www.hitachi.com/New/cnews/030902.html has an inbuilt antenna which, in principle, allows contactless communication, the achievable distances over which the antenna can communicate with a readar are greatly restricted due to the fact that the antenna is provided as integrated component which thus has very small dimensions. For this reason, the RFID tag known from http://www.hitachi.com/New/cnews/030902.html, due to the low power of transmitted waves, cannot be used for many RFID applications, or not with sufficiently good quality.

Araneo, R, Celozzi, S (2002) "FE Analysis of a Low-Frequency Microstrip Antenna", IEEE Transactions on Magnetics, vol. 38, No. 2, pages 729-732 discloses a finite element analysis as a model for a macroscopic microstrip antenna with dimensions in the range of a few centimeters. For the theoretical analysis according to Araneo, R, Celozzi, S (2002) "FE Analysis of a Low-Frequency Microstrip Antenna", IEEE Transactions on Magnetics, vol. 38, No. 2, pages 729-732, a basic plane is assumed on which a ferroelectric layer is arranged, on which a ferrimagnetic layer is arranged on which a microstrip antenna is arranged. According to Araneo, R, Celozzi, S (2002) "FE Analysis of a Low-Frequency Microstrip Antenna", IEEE Transactions on Magnetics, vol. 38, No. 2, pages 729-732, the ferroelectric material and the ferrimagnetic material are used for lowering the resonant frequency of the antenna and thus providing an antenna for low-frequency applications.

DE 36 13 258 A1 describes a semiconductor substrate with a monolithically integrated circuit and with an antenna structure coupled to the monolithically integrated circuit.

Furthermore, in EP 0 055 324 B1, a microwave circuit on a gallium arsenide substrate is described. The microwave circuit has a phase matching network and a radio-frequency feed network and a multiplicity of circuit structures which are connected via the circuit for controlling the electrical phase shift on radio-frequency paths.

EP 0 296 838 B1 discloses a microwave transmitter and a microwave receiver with an oscillator, the microwave transmitter and the microwave receiver, respectively, having a number of IMPATT diodes as active device. Furthermore, a microstrip surface area is provided there which, in operation, acts as resonator and, at the same time, as antenna. The IMPATT diodes and the microstrip surface area are formed from the same semiconductor substrate.

Furthermore, from DE 101 18 742 A1, a microwave millimeter wave module with integrated antenna is known. A multilayer substrate of a first dielectric layer, a second dielectric layer and a third dielectric layer are formed. On the third dielectric layer, a radio-frequency circuit line and on this a semiconductor chip is produced. A slotted hole is formed on one side of the second dielectric layer and an antenna feed line on the other side. In the first dielectric layer, a number of slotted holes are formed which radiate electromagnetic waves. An organic substrate is laminated onto the multilayer substrate by means of an adhesive layer.

EP 0 743 615 B1 describes a radio frequency identification tag circuit with embedded antenna coil. The antenna coil has two windings printed on opposite sides of a substrate. The lines of the first winding and the lines of the second winding are offset from one another in order to reduce parasitic capacitances between the windings.

SUMMARY

The invention is based on the object, for example, of providing a transceiver device by means of which sufficiently large electromagnetic power can be transmitted and which can be miniaturized and produced with supportable expenditure.

This object is achieved by means of a transceiver device having the features as claimed in the independent claim.

The transceiver device according to the invention contains a substrate with a layer of dielectric material with a relative permeability greater than 1 and/or with magnetic material with a relative magnetic permeability of greater than 1 and also contains an antenna monolithically integrated in the substrate on and/or in the layer, which antenna is arranged for transmitting and for receiving signals. Furthermore, the transceiver device has a circuit monolithically integrated in the substrate which is coupled to the monolithically integrated antenna.

A basic concept of the invention can be seen in providing a transceiver device with an antenna monolithically integrated in a substrate, in which antenna an effective (i.e. electromagnetically effective) lengthening of the antenna can be achieved, without increasing the geometric dimension, by the fact that material with a sufficiently high relative permeability or with sufficiently high magnetic permeability is formed at or in the interior of the antenna, i.e. in its immediate environmental area. By forming dielectric or magnetic material in an environmental area of the monolithically integrated antenna, the effective antenna length can be effectively increased and, at the same time, a small structural dimension of the transceiver device can be implemented. In other words, a miniaturized monolithically integrated antenna is used for creating a structure which has a similar functionality with regard to its electromagnetic properties to a larger antenna free of dielectric/magnetic material. This ensures good efficiency (particularly sufficiently great electromagnetic transmission of power in the communication of the transceiver device with a corresponding transceiver device, e.g. with a reader for a transceiver device arranged as RFID tag) with small geometric size of the monolithically integrated antenna. Due to these characteristics, the transceiver device according to the invention is particularly suitable for producing miniaturized RFID tags.

With the geometric length remaining the same, the invention thus achieves an effective electromagnetic lengthening of the antenna by providing material (e.g. support layers) with sufficiently high relative permeability $e_r$ or sufficiently high relative magnetic permeability $\mu_r$. This distinctly improves and increases the electromagnetic effect of the antenna without geometrically lengthening the antenna length predetermined by the chip size.

For the manufacturing process, the implementation of a transceiver device according to the invention only means the introduction of an additional level in the parallel chip manufacturing (for forming the dielectric/magnetic material) and on the other hand, the expensive manufacturing of an external antenna and the elaborate assembly of antenna and chip in series manufacturing becomes superfluous. This greatly lowers the overall manufacturing costs of the transceiver device, the cost savings being 50% and more.

For an antenna arranged in parallel on a substrate, the electromagnetically effective antenna length $L_{eff}$ is given by equation (1):

$$L_{eff} = L\sqrt{\epsilon_r \mu_r} \quad (1)$$

In equation (1), L is the geometric antenna length, $e_r$ is the relative permeability of the dielectric (e.g. ferroelectric) layer and $\mu_r$ is the relative magnetic permeability of the magnetic layer (e.g. a ferrite layer).

With a sufficiently large relative permeability $E_r$ or with a sufficiently large relative magnetic permeability $\mu_r$, the effective antenna length $L_{eff}$ can thus be much greater than the geometric size L. The relative permeability or the relative magnetic permeability, respectively, can be dependent on the frequency of electromagnetic radiation. This applies both to the absolute value of these two numbers and to their imaginary part and thus to the losses occurring in operation.

For example, a relative permeability in the range of a thousand can be obtained with ferroelectric films of barium strontium titanate (BST) for sufficiently low frequencies (e.g. 125 kHz), a relative magnetic permeability of some hundred can be achieved with a ferrite layer. This results in an effective lengthening of, for example, five hundred times compared with the actual antenna dimension for the electrically effective antenna.

The substrate can be an electronic chip. The substrate can be a silicon substrate, particularly a silicon chip. A circuit which processes signals coupled into the antenna or which provides signals to the antenna for radiation, respectively, can be monolithically integrated in the electronic chip.

The antenna can be implemented as microstrip antenna. The forming of a microstrip antenna is described, for example, in Araneo, R, Celozzi, S (2002) "FE Analysis of a Low-Frequency Microstrip Antenna", IEEE Transactions on Magnetics, vol. 38, No. 2, pages 729-732.

The antenna can have an electrically conductive layer on the layer of the dielectric material and/or the magnetic material.

Furthermore, the antenna can have an additional electrically conductive layer on the substrate and underneath the layer of the dielectric material and/or the magnetic material.

According to an embodiment of the antenna with an electrically conductive layer and an additional electrically conductive layer, the dielectric material and/or the magnetic material can be provided in a sandwich-like structure as layers or structures between the electrically conductive layer and the additional electrically conductive layer.

The additional electrically conductive layer can be formed as the topmost metallization plane of the substrate implemented as electronic chip.

According to this embodiment, the lower metal layer of the antenna is implemented in the topmost metallization plane of the chip or formed as part thereof. As an alternative, the lower metal layer can also be applied separately on a preprocessed chip.

The layer of the dielectric material can be formed as a layer above the additional electrically conductive layer and underneath the electrically conductive layer.

The layer of the magnetic material can be formed as layer above the additional electrically conductive layer and underneath the electrically conductive layer.

The dielectric material can have a permanent electrical polarization even in the absence of an external electrical field. In other words, according to this embodiment, the dielectric material is arranged in such a manner that a permanent polarization of this material is present even without an external electrical field.

The dielectric material can have, for example, a ferroelectric material or a ferrielectric material. Ferroelectric material is understood to be, for example, a material in which the atomic dipole moments essentially all have a common directional component. A ferrielectric material contains permanent electric dipoles with a first orientation and those with a second orientation opposite to the first orientation, the amounts of the electric dipoles compensating for one another only partially so that, as a result, permanent electric polarization is achieved even in the absence of an electrical field.

The dielectric material can have, e.g. barium strontium titanate (BST).

The magnetic material can have a permanent magnetic material. A permanent magnetic material is understood to be, for example, a material which has a magnetic dipole moment, i.e. a resultant magnetization, even in the absence of an external magnetic field.

For example, the magnetic material can have a ferromagnetic material or a ferrimagnetic material. In a ferromagnetic material, the atomic magnetic dipole moments all have a common directional component. A ferrimagnetic material contains permanent magnetic dipoles with a first orientation and those with a second orientation opposite to the first orientation, the amounts of the magnetic dipoles compensating for one another only partially so that, as a result, permanent magnetization is achieved even in the absence of an (external) magnetic field.

The magnetic material can have, for example, ferrite. A ferrite is a ferromagnetic material, for example of metal oxide with poor electrical conductivity.

The antenna and the layer of the dielectric material and/or the magnetic material can be formed either on the front or on the rear of the chip. When these components are formed on the front of the chip, i.e. in the vicinity of an integrated circuit which is formed in a surface area of the chip, short signal paths are achieved between antenna and electrical circuit components. On the other hand, forming antenna, dielectric material and/or magnetic material on the rear of the chip provides for higher flexibility in contacting the front of the chip. In choosing the arrangement of the components on the front or the rear of the chip, the feasibility of contacting the antenna must be taken into consideration.

Furthermore, a support element on and/or underneath which the substrate is arranged can be provided in the transceiver device. The support element can be, e.g. a plastic support.

For example, the transceiver device can be arranged as contactless chip card or identification medium ("ID tag, for example as RFID tag, e.g. a transponder). In these fields of application, the advantages of the transceiver device of the invention are important, namely simple configuration, inexpensive manufacturability and a sufficiently good and low-loss functionality in the receiving and transmitting of electromagnetic waves.

To illustrate, an antenna can be considered, for example, as an electromagnetic LC arrangement, that is to say as a type of resonant electromagnetic circuit. The antenna can be inductance-dominated or capacitance-dominated depending on whether the dominant influencing variable in the LC element is the capacitance C or the inductance L.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 1 illustrates a transceiver device according to a exemplary embodiment of the invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the further text, a transceiver device 100 according to one exemplary embodiment of the invention is described with reference to FIG. 1.

The transceiver device 100 contains a silicon chip 101 on which a lower metal antenna layer 102 is formed. On the lower metal antenna layer 102, a ferrite layer 103 with a high value of the relative magnetic permeability is formed. On the ferrite layer 103, a ferroelectric layer 104 with a high value of relative permeability is formed. On the ferroelectric layer 104, an upper metal antenna layer 105 is formed. The antenna 102, 105 is arranged as a microstrip antenna.

In and on the silicon chip 101, respectively, a monolithically integrated antenna 102, 105 is thus provided which is arranged for transmitting and receiving signals in the form of electromagnetic waves. Furthermore, in the transceiver device 100, a monolithically integrated circuit (not illustrated in FIG. 1) which is coupled to the monolithically integrated antenna 102, 105 is provided in the silicon substrate 101. Between the monolithically integrated circuit and the antenna 102, 105, electrical signals can be exchanged. For example, the antenna is adapted for receiving an electromagnetic signal and providing it for the monolithically integrated circuit for processing. Furthermore, the monolithically integrated circuit of the antenna can provide a signal which is radiated by the latter, wherein this radiated signal can be received by a reader (not illustrated in the figure). Between the reader and the transceiver device 100 arranged as RFID tag, communication via electromagnetic waves is thus made possible.

Due to the provision of the ferrite layer 103 and the ferroelectric layer 104, the effective length $L_{eff}$ of the antenna 102, 105 is distinctly enlarged compared with the geometric antenna length L according to equation (1). $E_r$ is the dielectric constant of the ferroelectric layer 104. $\mu_r$ is the relative magnetic permeability of the ferrite layer 103.

As an alternative to the arrangement in FIG. 1, the ferrite layer 102 can also be provided above the ferroelectric layer 104. As illustrated in FIG. 1, the antenna 102, 105, the ferroelectric layer 104 and the ferrite layer 103 are formed on the front (top) of the chip 101. In other words, the integrated circuit is integrated in a top surface area of the silicon chip 101 according to FIG. 1 and thus provided in the immediate vicinity of the antenna 102, 105. This keeps the signal paths short so that only low energy dissipation is registered during the signal transfer. Being able to operate with low energy is advantageous when the transceiver device is used as RFID tag.

FIG. 1 illustrates an arrangement in which the antenna 102, 105 can be provided to be integrated by using substrates with high relative permeabilities (e.g. ferroelectrics) or high permeabilities (e.g. ferrites) and can still transfer sufficiently large electromagnetic powers.

In the structure of a transceiver device 100 with an antenna 102, 105 according to the invention, illustrated in FIG. 1, the antenna is arranged as microstrip antenna. The ferroelectric layer 104 and the ferrite layer 103 are located between the upper metal antenna layer 105 and the counter electrode 102 underneath it (also of metal material). The layer thicknesses $h_e$ of the ferroelectric layer 104 and $h_m$ of the ferrite layer 103 are for example much less than the antenna width L.

The layers 102 to 105 illustrated in FIG. 1 can be applied to the preprocessed silicon chip 101. However, the lower metal layer 102 of the antenna can also be suitably implemented in the topmost metallization plane of the chip 101. A reverse sequence of the layers 103, 104 or applying the layers on the rear of the chip is also possible. In each case, the feasibility of contacting the antenna must be taken into consideration.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A transceiver device configured as an identification tag comprising:
    a substrate with a magnetic material with a relative magnetic permeability of greater than 1;
    an antenna monolithically integrated on a top surface area of the substrate, the antenna arranged for transmitting and for receiving signals; and
    a circuit monolithically integrated in the top surface area of the substrate below the monolithically integrated antenna, in an immediate vicinity of and coupled to the monolithically integrated antenna;
    wherein the arrangement of the circuit and the antenna lowers energy dissipation for signal transmission therebetween.

2. A transceiver device configured as an identification tag comprising:
    a substrate with a dielectric material with a relative permeability of greater than 1 and a magnetic material with a relative magnetic permeability of greater than 1;
    an antenna monolithically integrated on a top surface area of the substrate, the antenna arranged for transmitting and for receiving signals; and
    a circuit monolithically integrated the top surface area of in the substrate below the monolithically integrated antenna, in an immediate vicinity of and coupled to the monolithically integrated antenna;
    wherein the arrangement of the circuit and the antenna lowers energy dissipation for signal transmission therebetween.

3. The transceiver device as claimed in claim 2, wherein the substrate is an electronic chip.

4. The transceiver device as claimed in claim 2, wherein the antenna is a microstrip antenna.

5. The transceiver device as claimed in claim 2, wherein the antenna has an electrically conductive layer on the layer of the dielectric material and/or the magnetic material.

6. The transceiver device as claimed in claim 5, wherein the antenna has an additional electrically conductive layer on the substrate and underneath the layer of the dielectric material and/or the magnetic material.

7. The transceiver device as claimed in claim 6, wherein the additional electrically conductive layer is formed as the topmost metallization plane of the substrate implemented as electrical chip.

8. The transceiver device as claimed in claim 6, wherein the layer of the dielectric material is formed as a layer above the additional electrically conductive layer and underneath the electrically conductive layer.

9. The transceiver device as claimed in claim 6, wherein the layer of the magnetic material is formed as layer above the additional electrically conductive layer and underneath the electrically conductive layer.

10. The transceiver device as claimed in claim 2, wherein the dielectric material has a permanent electrical polarization even in the absence of an external electrical field.

11. The transceiver device as claimed in claim 2, wherein the dielectric material is one of a group comprising a ferroelectric material and a ferrielectric material.

12. The transceiver device as claimed in claim 2, wherein the dielectric material comprises barium strontium titanate.

13. The transceiver device as claimed in claim 2, wherein the magnetic material comprises a permanent magnetic material.

14. The transceiver device as claimed in claim 2, wherein the magnetic material is one of a group comprising a ferromagnetic material and a ferrimagnetic material.

15. The transceiver device as claimed in claim 2, wherein the magnetic material comprises ferrite.

16. The transceiver device as claimed in claim 3, wherein the antenna and the layer of the dielectric material and/or the magnetic material is formed on the front or the rear of the electronic chip.

17. The transceiver device as claimed in claim 2, with a support element on and/or wherein the substrate is arranged.

18. The transceiver device as claimed in claim 2, configured as contactless chip card.

19. A transceiver device comprising:
    a substrate with a layer of magnetic material having a relative magnetic permeability of greater than 1;
    an antenna monolithically integrated on a top surface area of the substrate, the antenna arranged for transmitting and for receiving signals; and
    a circuit monolithically integrated in the top surface area of the substrate below the monolithically integrated antenna, in an immediate vicinity of and coupled to the monolithically integrated antenna;
    wherein the arrangement of the circuit and the antenna lowers energy dissipation for signal transmission therebetween.

20. The transceiver device as claimed in claim 19, wherein the substrate also comprises:
    a second layer of dielectric material.

* * * * *